US008338031B2

(12) United States Patent
    Park

(10) Patent No.: US 8,338,031 B2
(45) Date of Patent: Dec. 25, 2012

(54) CATHODE AND LITHIUM BATTERY INCLUDING THE SAME

(75) Inventor: Kyu-sung Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 614 days.

(21) Appl. No.: 12/186,068

(22) Filed: Aug. 5, 2008

(65) Prior Publication Data
    US 2009/0186272 A1    Jul. 23, 2009

(30) Foreign Application Priority Data

Jan. 17, 2008    (KR) .................. 10-2008-0005332

(51) Int. Cl.
    *H01M 4/13*    (2010.01)
    *H01M 4/50*    (2010.01)
(52) U.S. Cl. .................. 429/231.95; 429/220; 429/222; 429/223; 429/224; 429/231.5
(58) Field of Classification Search .................. 429/223, 429/224, 220, 222, 231.5, 231.95
    See application file for complete search history.

(56) References Cited

U.S. PATENT DOCUMENTS

| 7,083,878 B2* | 8/2006 | Kotato et al. .................. 429/338 |
| 2002/0076612 A1* | 6/2002 | Tanizaki et al. ............... 429/223 |
| 2004/0157124 A1* | 8/2004 | Goh et al. .................. 429/231.1 |

FOREIGN PATENT DOCUMENTS

JP    2005-235628    * 9/2005

* cited by examiner

*Primary Examiner* — Ula C. Ruddock
*Assistant Examiner* — Thomas H. Parsons
(74) *Attorney, Agent, or Firm* — Christie, Parker & Hale, LLP

(57) ABSTRACT

Provided are a cathode and a lithium battery including the cathode. The cathode includes a cathode active material that includes an oxide represented by the following Formula 1:

$$Li_xNi_{0.5+y}(Mn_{1-z1-z2}M_{z1}Mo_{z2})_{0.5-y}O_2, \quad \text{<Formula 1>}$$

wherein $0.9<x<1.2$, $-0.02<y<0.2$, $0.001<z1<0.5$, $0.001<z2<0.5$, and M is a metallic atom having an oxidation number of +2.

8 Claims, 5 Drawing Sheets

CATHODE AND LITHIUM BATTERY INCLUDING THE SAME

CROSS-REFERENCE TO RELATED APPLICATION

This application claims the benefit of Korean Application No. 2008-5332, filed on Jan. 17, 2008, in the Korean Intellectual Property Office, the disclosure of which is incorporated herein by reference.

BACKGROUND OF THE INVENTION

1. Field of the Invention

Aspects of the present invention relate to a cathode and a lithium battery including the same, and more particularly, to a cathode having a high capacity and excellent high-rate properties, and a lithium battery including the same.

2. Description of the Related Art

In general, examples of a cathode active materials that are used in a lithium battery include $LiNiO_2$, $LiCoO_2$, $LiMn_2O_4$, $LiFePO_4$, $LiNi_xCo_{1-x}O_2$ ($0<x<1$), and $LiNi_{1-x-y}Co_xMn_yO_2$ ($0 \leq x \leq 0.5$ and $0 \leq y \leq 0.5$). However, there is a need to improve the high-rate properties and capacity of these cathode active materials, so as to produce a lithium battery having a high capacity. Lithium batteries having a high capacity have become more necessary, as mobile electronic devices have become more complex and perform more functions. Such lithium batteries can be made by changing the design of a battery system, developing improved manufacturing techniques, and by improving battery forming materials.

$LiNi_{0.5}Mn_{0.5}O_2$ is getting more attention as an active material because Co, which is expensive and toxic, is not included therein. However, the use of $LiNi_{0.5}Mn_{0.5}O_2$ may result in a decrease in capacity and high-rate properties, because $Ni^{2+}$ migrates into an Li layer. Such phenomenon may occur due to the ionic radii of $Li^+$ ions and $Ni^{2+}$ ions. Specifically, in a hexahedron crystal structure, $Li^+$ ions have an ionic radius of 0.74 Å and $Ni^{2+}$ has an ionic radius of 0.7 Å. Therefore, when the active material is prepared, cation mixing occurs, due to the similar ionic radii.

Until now, many methods have been developed to hinder cation mixing when the active material is prepared. For example, cation mixing can be prevented by preparing $NaNi_{0.5}Mn_{0.5}O_2$ and then substituting the $Na^+$ with $Li^+$. However, this method is complex, and the obtained active material has a short cycle life.

Therefore, there is a need to develop a cathode active material having a high capacity and excellent high-rate properties, which can be prepared using a simple process.

SUMMARY OF THE INVENTION

Aspects of the present invention provide a cathode having a high capacity and excellent high-rate properties.

Aspects of the present invention also provide a lithium battery including the cathode.

According to an aspect of the present invention, there is provided a cathode prepared by forming a cathode active material composition, including a conductive agent, a binder, and a cathode active material, on one surface of a collector. The cathode active material includes an oxide represented by Formula 1:

$Li_xNi_{0.5+y}(Mn_{1-z1-z2}M_{z1}Mo_{z2})_{0.5-y}O_2$, <Formula 1>

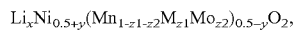

wherein $0.9<x<1.2$, $-0.02<y<0.2$, $0.001<z1<0.5$, $0.001<z2<0.5$, and M is a metallic atom having an oxidation number of +2.

According to an exemplary embodiment of the present invention, $0.5<z2/z1<1.5$.

According to an exemplary embodiment of the present invention, M may include one or more metallic element selected from the group consisting of Mg, Ni, Zn, Cd, Cu, and Ca.

According to an exemplary embodiment of the present invention, M may be Mg or Ni.

According to an aspect of the present invention, there is provided a lithium battery including: the cathode; an anode; and an organic electrolyte.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EXEMPLARY EMBODIMENTS

Figure 1:
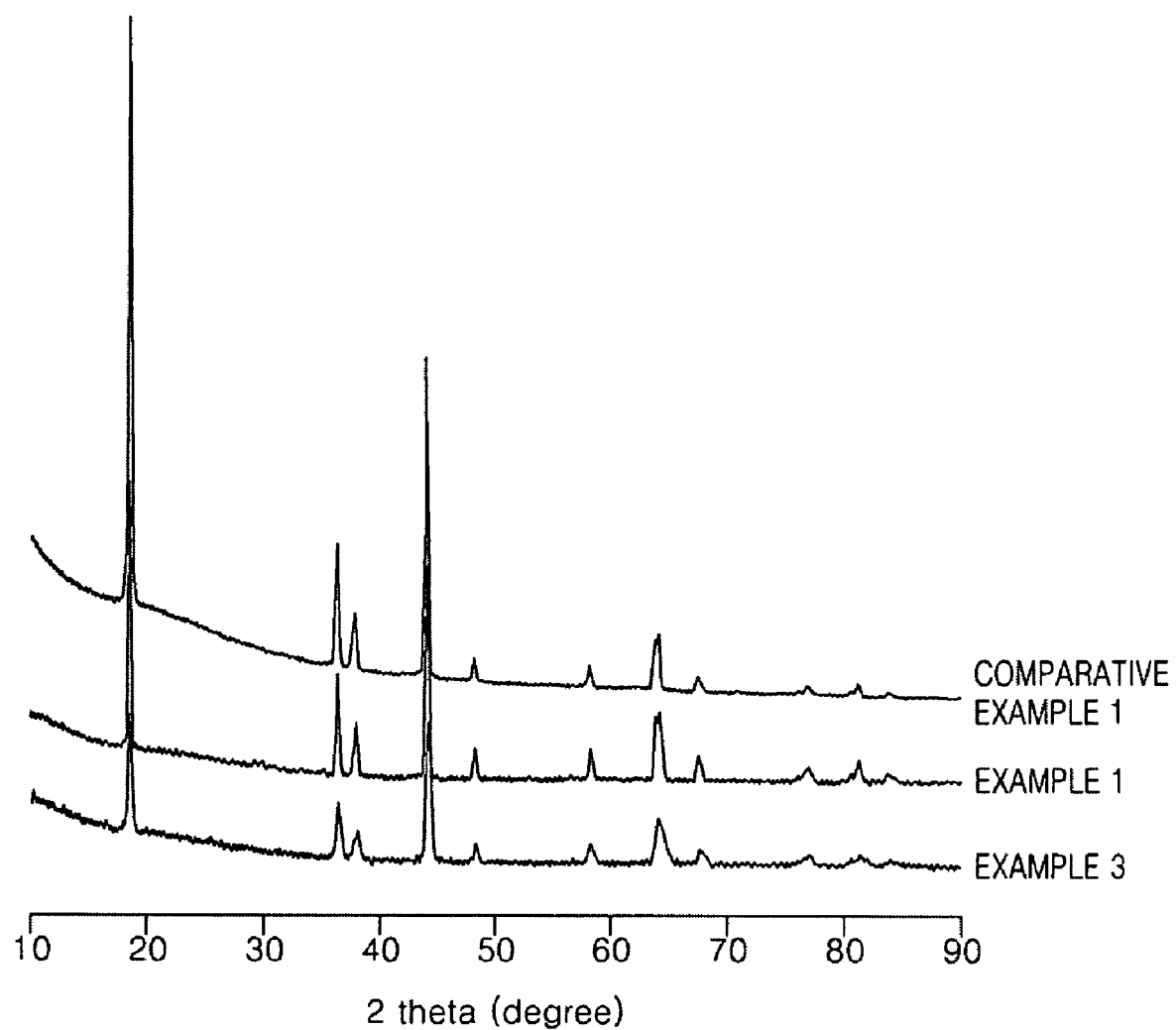
FIG. 1 is an x-ray diffraction (XRD) graph of the cathode active materials prepared according to Comparative Example 1, and Examples 1 and 3.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

A cathode, according to aspects of the present invention, includes an oxide represented by Formula 1 as an active material:

$Li_xNi_{0.5+y}(Mn_{1-z1-z2}M_{z1}Mo_{z2})_{0.5-y}O_2$, <Formula 1> wherein $0.9<x<1.2$, $-0.02<y<0.2$, $0.001<z1<0.5$, $0.001<z2<0.5$, and M is a metallic atom having an oxidation number of +2.

The oxide represented by Formula 1 is developed to resolve problems resulting from $LiNi_{0.5}Mn_{0.5}O_2$, which is a conventional active material, and/or other problems. Specifically, the Mn of the conventional active material is substituted with another element or elements, to obtain an active material having a stable stacked structure, a high capacity, and excellent high-rate properties.

In the case of the conventional $LiNi_{0.5}Mn_{0.5}O_2$, $Ni^{2+}$ migrates into an $Li^+$ site, and thus, the capacity and high-rate properties are reduced. Also, during charging, the oxidation number of Ni, which is present on an Li layer, increases, and thus, the size of the Ni is decreased. As a result, the distance between Li layers is decreased, and the diffusion of lithium ions is hindered. Such a phenomenon may occur due to a similarity of ionic radii. That is, $Ni^{2+}$ and $Li^+$ have similar ionic radii, and cation mixing occurs in the preparation process. Therefore, the occupation ratio of the Ni in the transition metal layer may be reduced, and thus, a conductive pathway is degraded, and electronic conductivity is decreased. Such a decrease in electronic conductivity can be prevented by decreasing the amount of Mn, when an active material is prepared, and by increasing the amount of Ni that is electrochemically active. In this regard, the capacity can be increased, but a structural change may occur during charging and discharging, due to the increased amount of $Ni^{3+}$. Therefore, there is a need to maintain the +2 oxidation number of Ni during discharging and to maintain the amount of Ni that is electrochemically active.

According to aspects of the present invention, in an $LiNi_{0.5}Mn_{0.5}O_2$ active material, the amount of Ni that is electrochemically active is maintained, but electrochemically inactive Mn (oxidation number +4) is substituted with another element or elements. As a result, the active material can have a more stable stacked structure, improved capacity, and improved high-rate properties. Specifically, M (oxidation number +2) and Mo (oxidation number +6) may both be substituted with Mn, in a ratio of about 1:1, so as to obtain a cathode active material represented by the following Formula 1:

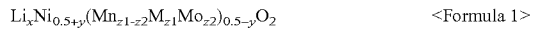

$$Li_xNi_{0.5+y}(Mn_{z1-z2}M_{z1}Mo_{z2})_{0.5-y}O_2 \quad \text{<Formula 1>}$$

wherein $0.9<x<1.2$, $-0.02<y<0.2$, $0.001<z1<0.5$, $0.001<z2<0.5$, and

M is a metallic atom having an oxidation number of +2.

In Formula 1, $M^{+2}$ and $Mo^{+6}$ are partially substituted for Mn. M may include one or more metallic elements selected from the group consisting of Mg, Ni, Zn, Cd, Cu, and Ca. M may be present in a mole ratio of about 0.5z1, based on 1 mole of Li, and z1 may be in a range of 0.001 to 0.5. For example, z1 may be in a range of 0.01 to 0.4. When z1 is greater than 0.5, a secondary phase may be formed. On the other hand, when z1 is less than 0.001, no improvement effect on a capacity and high-rate properties may occur.

$Mo^{+6}$ and $M^{+2}$ are partially substituted for Mn. Therefore, the resultant oxidation number is +4, and thus, the charge balance of the oxide represented by Formula 1 is maintained. Like M, Mo may improve the high-rate properties and capacity, by partially substituting for Mn, together with M. Mo may be present in a mole ratio of about 0.5z2, based on 1 mole of Li. The z2 may be in a range of 0.001 to 0.5, and preferably in a range of 0.01 to 0.4. When z2 is less than 0.5, a secondary phase may be formed. On the other hand, when z2 is greater than 0.001, no improvement effect of a capacity and high-rate properties may occur.

The z1 and z2 may satisfy $0.5<z2/z1<1.5$. When z1 and z2 are outside this range, it may be difficult to achieve some aspects of the present invention.

The oxide represented by Formula 1 may be prepared using any suitable method that is known in the art. For example, the oxide represented by Formula 1 can be prepared using a solid state reaction method or a coprecipitation method. According to the coprecipitation method, the carbonates or acetates of metal elements which form the oxide represented by Formula 1, are dissolved in water including an acetic acid. Then an acidic solution, such as an oxalic acid, is added to the obtained solution, to cause a precipitation reaction. The reaction product is dried to obtain precipitates. The obtained precipitates are decomposed and heat-treated to obtain an oxide.

The oxide represented by Formula 1 has excellent high-rate properties and a high capacity, and thus, is a suitable cathode active material. A cathode, according to aspects of the present invention, is prepared by forming a cathode active material composition, including a conductive agent, a binder, and a cathode active material prepared according to Formula 1, on one surface of a collector.

In the cathode active material composition, the conductive agent may be carbon black, and the binder may be a vinylidene fluoride/hexafluoropropylene copolymer, a polyvinylidenefluoride, a polyacrylonitrile, a polymethylmetacrylate, a polytetrafluoroethylene, a mixture thereof, or a styrene butadiene rubber-based polymer. In this regard, the amounts of the cathode active material, the conductive agent, and the binder may be the same as in conventional lithium batteries.

The collector, on which the cathode active material composition is formed, may be any suitable collector that is used in a cathode of a lithium battery. For example, the collector may be an Al collector. The size and thickness of the collector may be the same as in conventional lithium batteries.

A method of preparing a cathode, according to the aspects of the present invention, will now be described in detail. First, a slurry including a binder, a conductive agent, a cathode active material, and an organic solvent is uniformly coated on a collector and then dried, to completely remove the organic solvent. As a result, a cathode active material composition layer is formed on the collector.

The conductive agent and the binder may be the same as described above. The organic solvent may be a chain carbonate; such as dimethyl carbonate, ethylmethyl carbonate, diethyl carbonate, or dipropyl carbonate; a cyclic carbonate, such as dimethoxyethane, diethoxyethane, ester derivates of fatty acids, ethylene carbonate, propylene carbonate, or butylene carbonate; gamma-butyrolactone; N-methylpyrrolidone; acetone; water; or a combination thereof.

Like the method of preparing a cathode, an anode active material, a conductive agent, a binder, and a solvent are mixed to prepare anode active material slurry. The anode active material slurry may be directly coated on a Cu collector to obtain an anode. Alternatively, the anode active material slurry may be coated on a separate support. Then an anode active material film is exfoliated from the separate support and is laminated on a Cu collector, to obtain an anode. In this regard, the amounts of the anode active material, the conductive agent, the binder, and the solvent may be the same as in conventional lithium batteries.

The anode active material may be lithium metal, a lithium alloy, a carbonaceous material, or graphite. The conductive agent, the binder, and the solvent may be the same as those in the cathode. In some cases, the cathode active material composition and the anode active material composition may further include a plasticizer to form pores in an electrode plate.

The cathode and the anode may be separated by a separator. The separator can be any suitable separator that is commonly used in a lithium battery. Specifically, the separator may have a low resistance to ion mobility and excellent electrolytic solution retaining properties. Examples of the separator include glass fiber, polyester, polyethylene, polypropylene, polytetrafluoroethylene (PTFE), and a combination thereof, each of which can be a nonwoven fabric or a woven fabric. For example, a lithium ion battery uses a foldable separator formed of polyethylene or polypropylene, and a lithium ion polymer battery uses a separator having an excellent organic electrolytic solution retaining capability. A method of preparing these separators will now be described in detail.

A polymer resin, a filler, and a solvent are mixed to prepare a separator composition. The separator composition may be directly coated on an electrode and then dried to form a separator film. Alternatively, the separator composition may be cast on a support and then dried to form a separator composition film. The separator composition film is separated from the support and laminated on an electrode, to form a separator film.

The polymer resin is not particularly limited and can be any suitable material that is used as a binder of an electrode plate. For example, the polymer resin can be a vinylidene fluoride/hexafluoropropylene copolymer; polyvinylidenefluoride, polyacrylonitrile, polymethylmethacrylate, a mixture thereof, or the like. For example, the polymer resin may be a vinylidene fluoride/hexafluoropropylene copolymer in which the amount of the hexafluoropropylene is in a range of 8-25 wt %.

The separator is sandwiched between the cathode and the anode to form a battery assembly. The battery assembly is wound or folded such that it can be placed in a spherical battery case or a rectangular battery case. An organic electrolytic is injected into the case, to complete a lithium ion battery.

A plurality of battery assemblies can be stacked in a bi-cell structure, and then dipped in an organic electrolytic solution. The obtained structure is placed in a pouch and sealed, to complete a lithium ion polymer battery.

The organic electrolyte may include a lithium salt, and an organic solvent mixture of a high dielectric constant solvent and a low boiling point solvent. The high dielectric constant solvent may be any suitable solvent that is used in the art. For example, the high dielectric constant solvent may be a cyclic carbonate, such as ethylene carbonate, propylene carbonate, or butylene carbonate; or gamma-butyrolactone.

The low boiling point solvent may be any suitable solvent that is used in the art. For example, the low boiling point solvent may be a chain carbonate, such as dimethyl carbonate, ethylmethyl carbonate, diethyl carbonate, or dipropyl carbonate; or ester derivates of fatty acids.

The mixture ratio of the high dielectric constant solvent to the low boiling point solvent may be in a range of 1:1 to 1:9. When the mixture ratio is outside this range, discharge capacity and charge and discharge lifetimes may be reduced.

The lithium salt may be any suitable lithium salt that is used in conventional lithium batteries. For example, the lithium salt may include one or more compounds selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$.

In the organic electrolyte, the concentration of the lithium salt may be in a range of 0.5 to 2M. When the concentration of the lithium salt is less than 0.5M, the conductivity of the organic electrolyte may be decreased. On the other hand, when the concentration of the lithium salt is greater than 2.0M, the viscosity of the organic electrolyte may be increased, and the mobility of lithium ions may be degraded.

Aspects of the present invention will be described in further detail with reference to the following examples. These examples are for illustrative purposes only and are not intended to limit the scope of the present invention.

Comparative Example 1

A cathode active material was prepared by oxalate coprecipitation. First, $Li_2CO_3$, Ni acetate, and Mn acetate, in amounts corresponding to the $LiNi_{0.5}Mn_{0.5}O_2$, were dissolved in water including an acetic acid. Then, an oxalic solution was added to the resultant solution, to cause a precipitation reaction. When the precipitation reaction was completed, the reaction solution was dried using a hot plate, to remove the water. The obtained precipitates were decomposed at 500° C., for 3 hours, and then heat-treated at 950° C., for 5 hours, to complete a phase formation.

The cathode active material and a carbonaceous conductive agent (Ketjen Black, EC-600JD) were uniformly mixed, at a weight ratio of 93:3, and then a PVDF binder solution was added thereto, to prepare a slurry. The slurry included the cathode active material, the carbonaceous conductive agent, and the binder in a weight ratio of 93:3:4. The slurry was coated on a 15 μm-thick aluminum foil and then dried, to form a cathode plate. Then, vacuum drying and pressing processes were performed to produce a coin cell (CR2016 type). Then a charge and discharge test was performed using the coin cell.

The coin cell included a metallic lithium counter electrode and an electrolyte (1.3M $LiPF_6$ in a mixture of EC, DEC, and FEC, at a volume ratio of 2:6:2). The charge and discharge test was performed by charging the coin cell with a constant current of 0.1 C, until the voltage reached 4.3/4.5V and then discharging the coin cell with a varying current of 0.1 C to 4 C, until the voltage reached to 2.5V.

Comparative Example 2

A cathode active was prepared in the same manner as in Comparative Example 1, except that the amounts of $Li_2CO_3$, Ni acetate, and Mn acetate were determined according to $LiNi_{0.5}(Mn_{0.9}Ni_{0.1})_{0.5}O_2$. A cathode and a coin cell were manufactured in the same manner as in Comparative Example 1, and a charge and discharge test was performed in the same manner as in Comparative Example 1.

Example 1

A cathode active material was prepared by oxalate coprecipitation. First, $Li_2CO_3$, Ni acetate, and Mn acetate, in amounts corresponding to the formula $LiNi_{0.5}(Mn_{0.8}Ni_{0.1}Mo_{0.1})_{0.5}O_2$, were completely dissolved in an acetic acid solution. Separately, ammonium heptamolybdate, in an amount corresponding to the formula $LiNi_{0.5}(Mn_{0.8}Ni_{0.1}Mo_{0.1})_{0.5}O_2$, was completely dissolved in a citric acid. Both solutions were mixed, and then an oxalic acid solution was added thereto, to cause a precipitation reaction. When the precipitation reaction was completed, the reaction solution was dried using a hot plate, to remove the water. The obtained precipitates were decomposed at 500° C., for 3 hours, and then heat-treated at 950° C., for 5 hours, to complete a phase formation. In $LiNi_{0.5}(Mn_{0.8}Ni_{0.1}Mo_{0.1})_{0.5}O_2$, the Mn was partially substituted with $Ni^{+2}$ and $Mo^{+6}$.

A cathode and a coin cell were manufactured in the same manner as in Comparative Example 1, and a charge and discharge test was performed in the same manner as in Comparative Example 1.

Example 2

An active material was prepared in the same manner as in Example 1, except that the amounts of $Li_2CO_3$, Ni acetate, ammonium heptamolybdate, and Mn acetate were determined according to the formula $LiNi_{0.5}(Mn_{0.6}Ni_{0.2}Mo_{0.2})_{0.5}O_2$. A cathode and a coin cell were manufactured in the same manner as in Comparative Example 1, and a charge and discharge test was performed in the same manner as in Comparative Example 1.

Example 3

An active material was prepared in the same manner as in Example 1, except that the amounts of $Li_2CO_3$, Ni acetate, ammonium heptamolybdate, and Mn acetate were determined according to the formula $LiNi_{0.5}(Mn_{0.8}Mg_{0.1}Mo_{0.1})_{0.5}O_2$, and the amount of the Mg was controlled by dissolving Mg nitrate in the transition solution. In the $LiNi_{0.5}(Mn_{0.8}Mg_{0.1}Mo_{0.1})_{0.5}O_2$, Mn was partially substituted with $Ni^{+2}$ and $Mo^{+6}$. A cathode and a coin cell were manufactured in the same manner as in Comparative Example 1, and a charge and discharge test was performed in the same manner as in Comparative Example 1.

An XRD analysis was performed on the cathode active materials prepared according to Comparative Example 1, and Examples 1 and 3. The results are shown in FIG. 1. Referring to FIG. 1, it was identified that all of the cathode active materials were present in a single phase, i.e., not in secondary phase. Mo is inclined to form a secondary phase with other transition metals when elements are non-uniformly mixed in the manufacturing process, but when the coprecipitation method is used, impurities were not formed. In the case of Comparative Example 1, peaks (108) and (110), which were located in the vicinity of 64 degrees, were not distinguishable from each other. On the other hand, in the case of Examples 1 and 3, the peaks (108) and (110) were able to be distinguished from each other. This indicates that a layered structure was enhanced, and the cation mixing of Ni into a Li layer was reduced.

Figure 2:
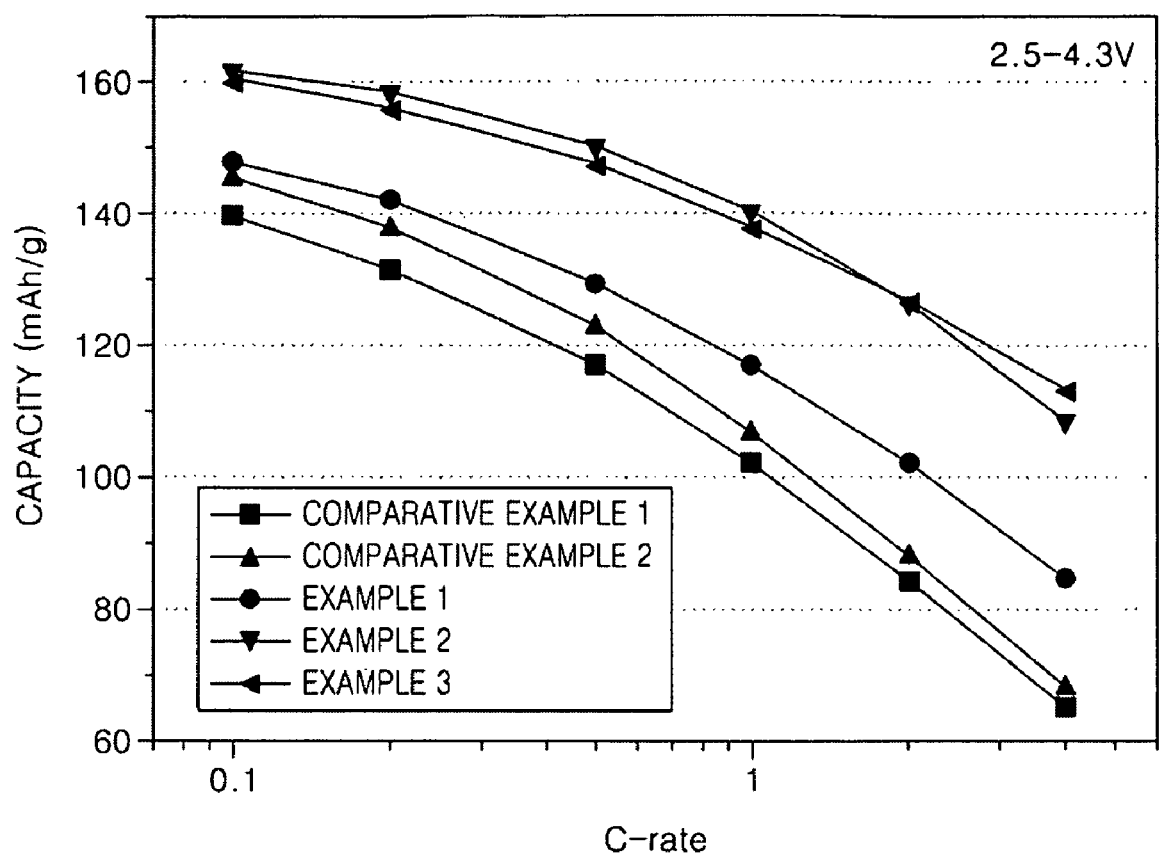
FIG. 2 is a graph of a discharge capacity with respect to a current density of the coin cells prepared according to Comparative Examples 1 and 2, and Examples 1-3.
Figure 3:
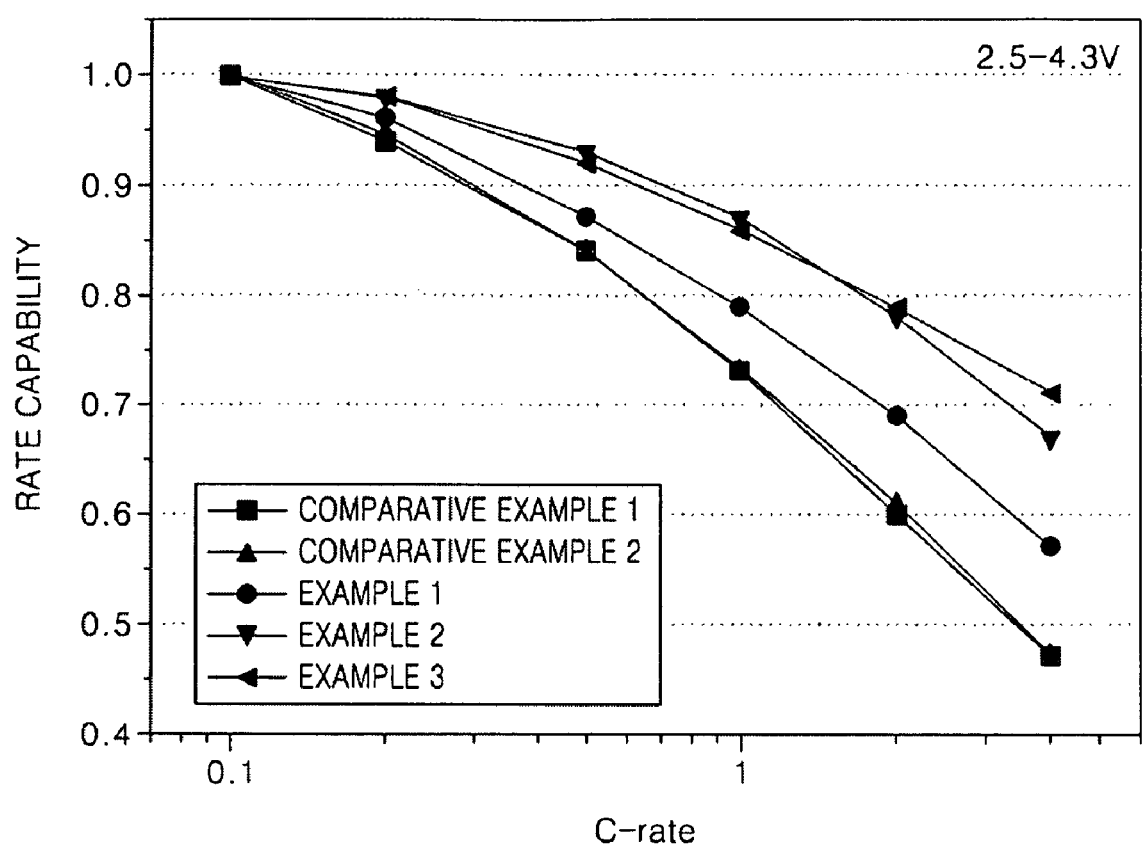
FIG. 3 is a graph of a high-rate characteristic of the coin cells prepared according to Comparative Examples 1 and 2, and Examples 1-3.

FIG. 2 is a graph of a discharge capacity with respect to a current density of the coin cells prepared according to Comparative Examples 1 and 2, and Examples 1-3. Referring to FIG. 2, the coin cells prepared according to Examples 1 to 3 had a higher discharge capacity than the coin cells prepared according to Comparative Example 1. In addition, referring to FIG. 3, the coin cells prepared according to Example 1 to 3 had better high-rate capabilities than the coin cells prepared according to Comparative Examples 1 and 2. Specifically, the coin cell prepared according to Example 3, in which Mn was substituted with 0.1Mg and 0.1Mo had a similar capacity and high-rate properties as the coin cell prepared according to Example 2, in which Mn was substituted with 0.2Mg and 0.2Mo. Therefore, it was identified that the Mg/Mo combination was more effective than the Ni/Mo combination. Specifically, at 4 C, the coin cell prepared according to Example 3 had high-rate properties 24% greater than the coin cell prepared according to Comparative Example 1, and had a capacity that was 48 mAh/g greater than that of the coin cell prepared according to Comparative Example 1.

A charge and discharge test was performed on the coin cell prepared according to Example 3. As a result, an over-voltage was reduced, and a charge voltage was reduced, while a discharge voltage was not changed. Therefore, it was identified that, in the same voltage range, the coin cell can be charged and discharged with more energy.

In the case of Examples 1 and 2, when more Mn was substituted, an increase in Ni resulted in a higher capacity and better high-rate properties. Also, it was identified that more Ni (the same amount in Example 1) may not guarantee an improvement in high-rate properties, in view of the coin cells prepared according to Comparative Examples 1 and 2, which is apparent with reference to FIG. 3. Therefore, it can be seen that excellent electrochemical properties can be obtained when $Mn^{4+}$ sites are substituted with an element having an oxidation number of +2 and an element having an oxidation number of +6, and the same amount of both elements is used.

Figure 4:
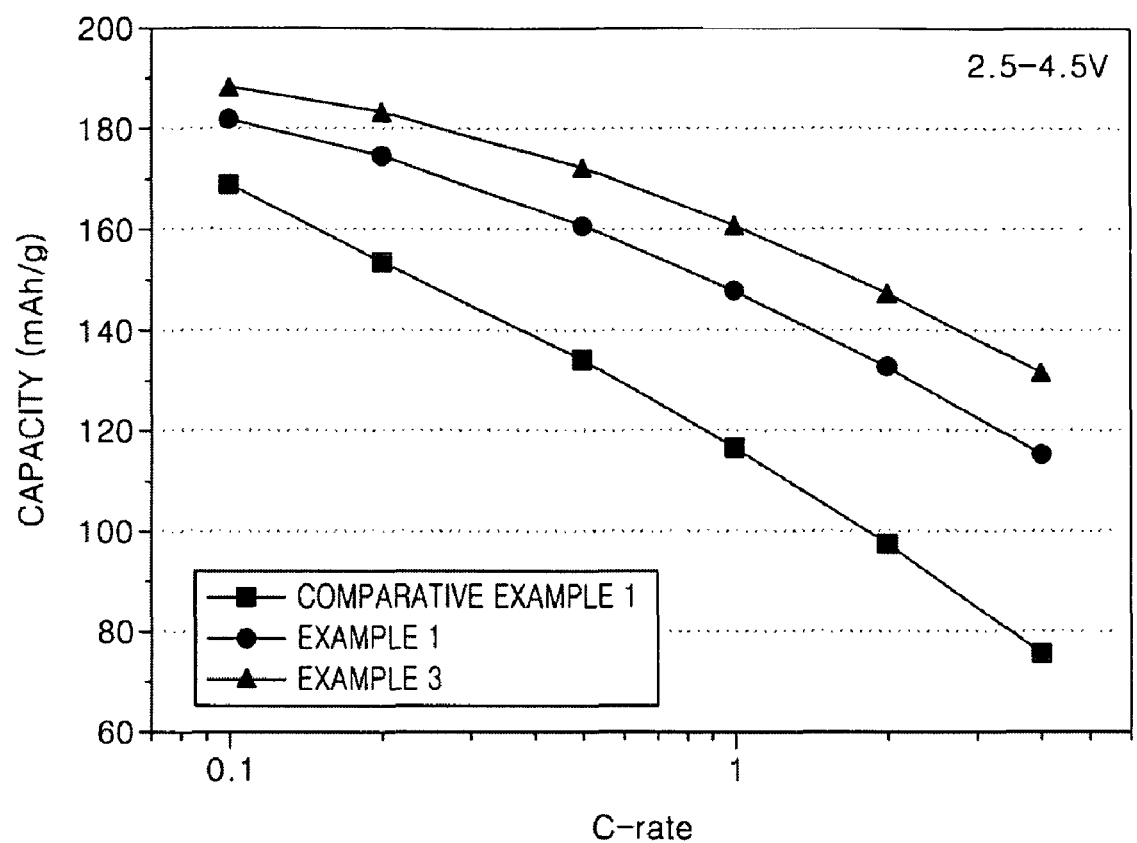
FIG. 4 is a graph of a capacity with respect to a current density of the coin cells prepared according to Comparative Example 1, and Examples 1 and 3.
Figure 5:
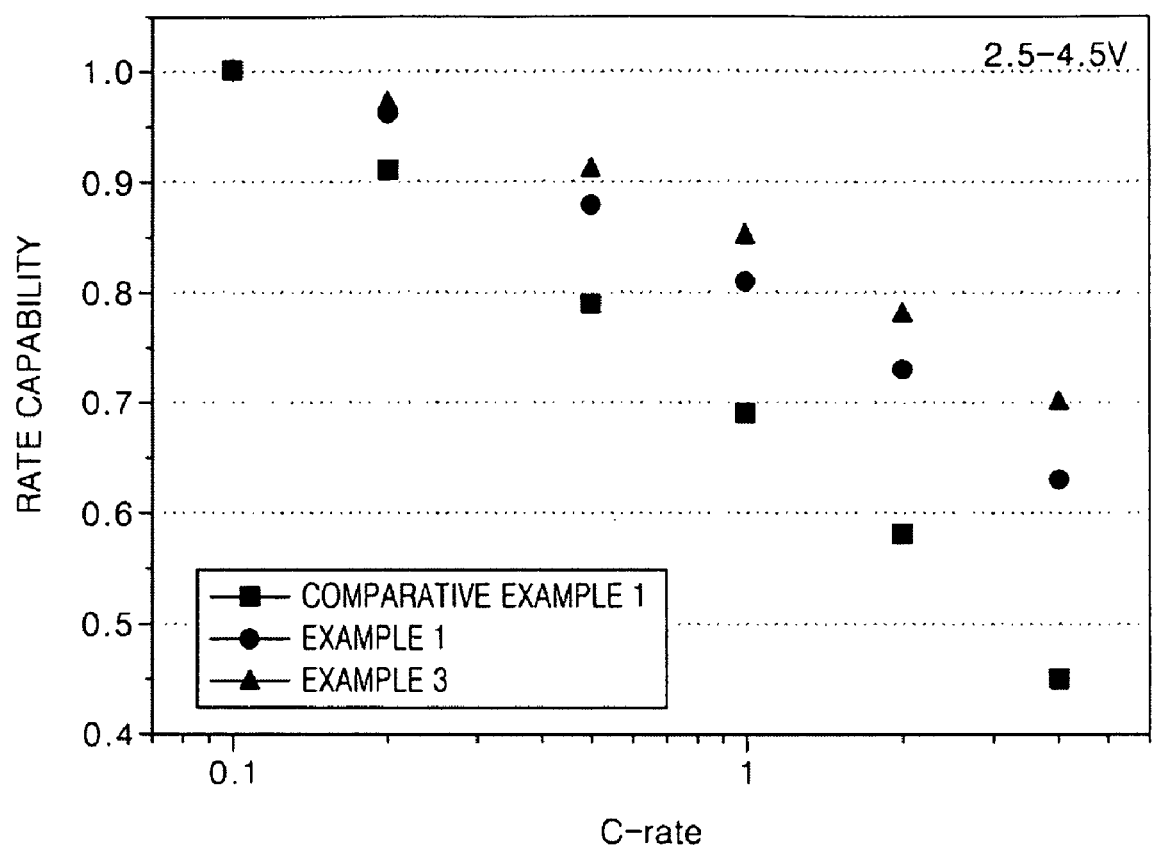
FIG. 5 is a graph of a high-rate characteristic with respect to a current density of the cells prepared according to Comparative Example 1, and Examples 1 and 3.

FIGS. 4 and 5 are graphs of a capacity with respect to high-rate properties of the same material, when a charge voltage was increased to 4.5V. In Example 3, when the current density was 1 C, the capacity was 188 mAh/g. However, when the current density was increased to 4 C, the capacity was maintained at up to 70% of the initial capacity. In Example 1, when the current density was 0.1 C, the capacity was 182 mAh/g. However, when the current density was increased to 4 C, the capacity was maintained at up to 60% of the initial capacity. On the other hand, in Comparative Example 1, when the current density was 0.1 C, the capacity was 169 mAh/g. However, when the current density was increased to 4 C, the capacity was only maintained up to 45% of the initial capacity. Such a capacity maintenance rate was 18% smaller than that of Example 3. Therefore, it was identified that a cathode active material, according to exemplary embodiments of the present invention, is very effective, even during high-voltage charging and discharging.

A cathode according to exemplary embodiments of the present invention includes an active material having a high capacity, excellent high-rate properties, and shows improved electrochemical properties. Therefore, the cathode is useful for a lithium battery.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A cathode comprising:
   a current collector; and
   a cathode active material composition disposed on the current collector, comprising a conductive agent, a binder, and a cathode active material comprising an oxide represented by Formula 1:

$$Li_xNi_{0.5+y}(Mn_{1-z1-z2}M_{z1}Mo_{z2})_{0.5-y}O_2, \qquad <\text{Formula 1}>$$

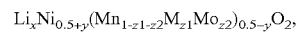

wherein $0.9 < x \leq 1.0$, $-0.02 < y < 0.2$, $0.001 < z1 < 0.5$, $0.001 < z2 < 0.5$, and M is a metallic atom having an oxidation number of +2 and comprises one selected from the group consisting of Mg, Zn, Cd, Cu, and Ca.

2. The cathode of claim 1, wherein M is Mg.

3. A lithium battery comprising:
   the cathode of claim 2;
   an anode; and
   an organic electrolyte.

4. The cathode of claim 1, wherein $0.5 < z2/z1 < 1.5$.

5. A lithium battery comprising:
   the cathode of claim 4;
   an anode; and
   an organic electrolyte.

6. A lithium battery comprising:
   the cathode of claim 1;
   an anode; and
   an organic electrolyte.

7. The lithium battery of claim 6, wherein the cathode active material is $LiNi_{0.5}(Mn_{0.8}Mg_{0.1}Mo_{0.1})_{0.5}O_2$.

8. The cathode of claim 1, wherein the cathode active material is $LiNi_{0.5}(Mn_{0.8}Mg_{0.1}Mo_{0.1})_{0.5}O_2$.

\* \* \* \* \*